United States Patent
Hein et al.

(10) Patent No.: US 6,427,026 B1
(45) Date of Patent: Jul. 30, 2002

(54) VIDEO DECODER AND CORRESPONDING METHOD

(75) Inventors: Soeren Hein, München; Wolfgang Meier, Höhenkirchen; Norbert Wehn, Queidersbach, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/178,198

(22) Filed: Oct. 23, 1998

Related U.S. Application Data

(63) Continuation of application No. PCT/DE97/00866, filed on Apr. 22, 1997.

(30) Foreign Application Priority Data

Apr. 23, 1996 (DE) .......................... 196 16 201
Apr. 29, 1996 (DE) .......................... 196 17 171

(51) Int. Cl.$^7$ .............................. G06K 9/36; G06K 9/46
(52) U.S. Cl. ...................................... 382/233; 382/236
(58) Field of Search ................. 382/233, 236; 348/715, 716

(56) References Cited

U.S. PATENT DOCUMENTS 5,646,693 A * 7/1997 Cismas ..................... 348/44
5,818,533 A * 10/1998 Auld et al. ................ 348/412
5,835,636 A * 11/1998 Auld ......................... 382/233
5,874,995 A * 2/1999 Naimpally et al. ........ 348/384

FOREIGN PATENT DOCUMENTS

| DE | 195 21 973 A1 | 12/1995 |
| EP | 0 600 446 A2 | 6/1994 |
| EP | 0 703 712 A2 | 3/1996 |
| EP | 0 710 033 A2 | 5/1996 |

OTHER PUBLICATIONS

International Publication No. WO 96/06506 (Prange et al.), dated Feb. 29, 1996.

* cited by examiner

Primary Examiner—Phuoc Tran
(74) Attorney, Agent, or Firm—Herbert L. Lerner; Laurence A. Greenberg; Werner H. Stemer

(57) ABSTRACT

A decoder has a first memory for storing a coded first image. The image is stored in the first memory until it has been decoded at least twice. The results of the decoding operations can be supplied to a playback device. The invention makes it possible to dispense with an output frame buffer for the decoded first image, and thus only little memory is required in the decoder.

8 Claims, 4 Drawing Sheets

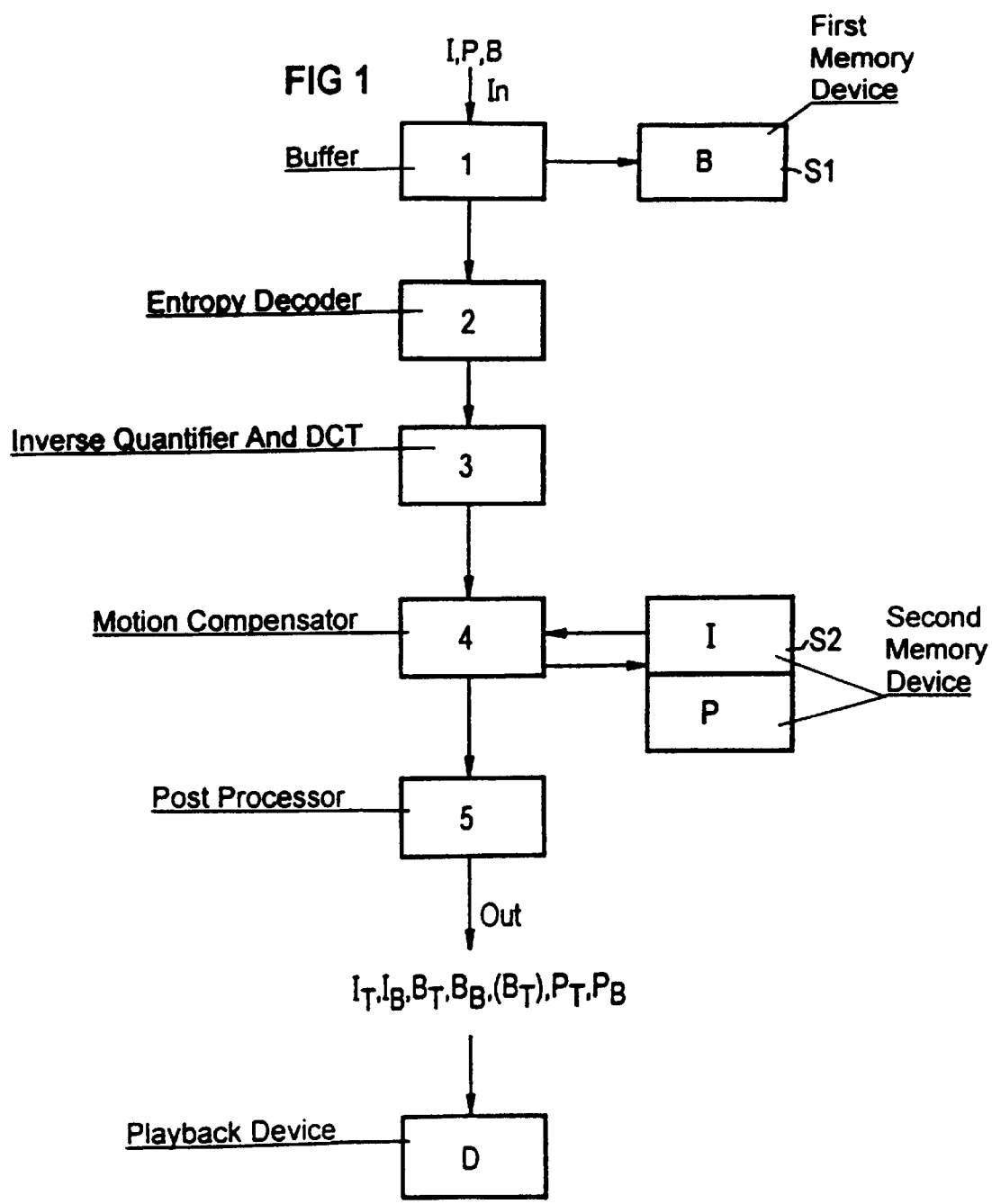

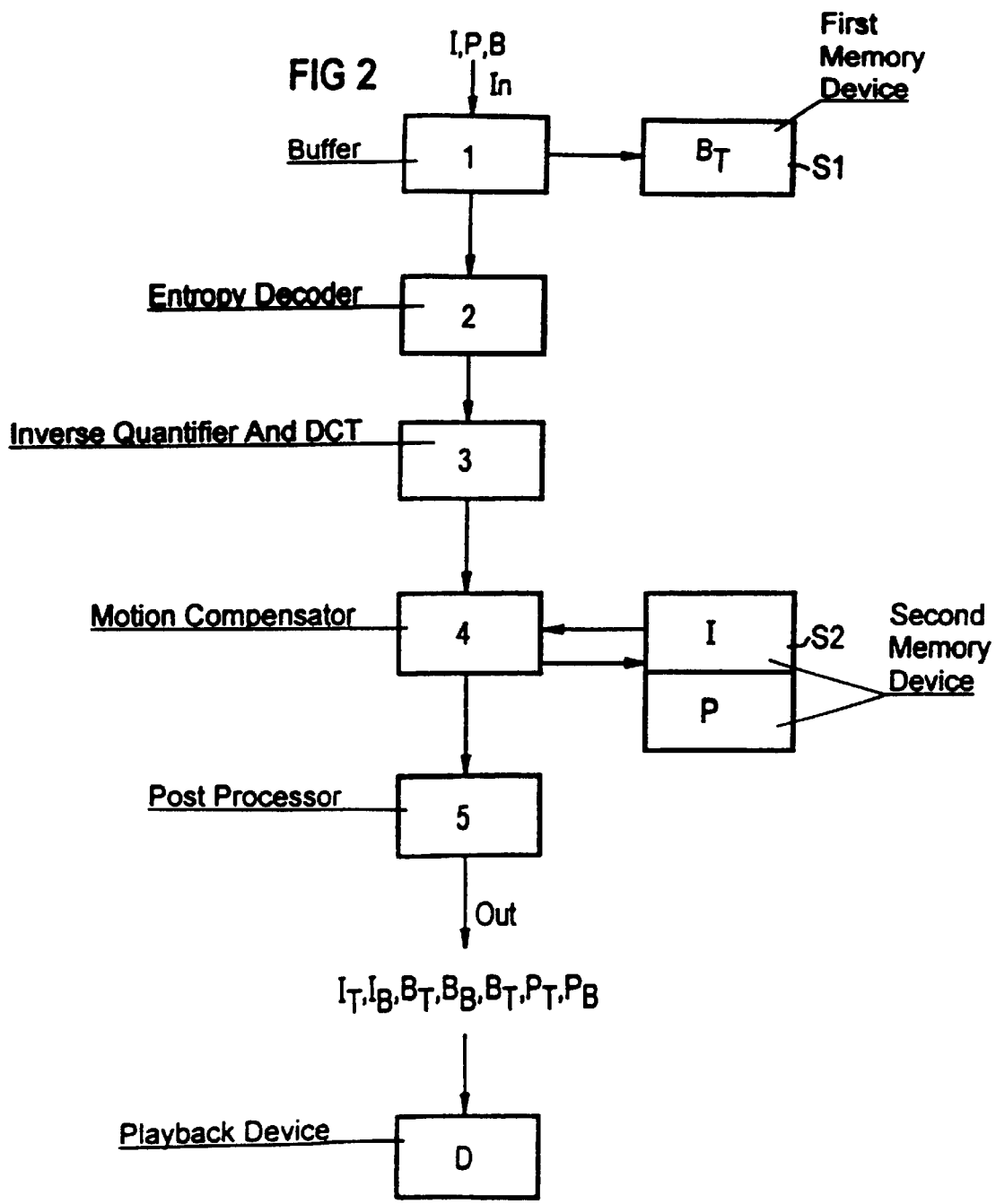

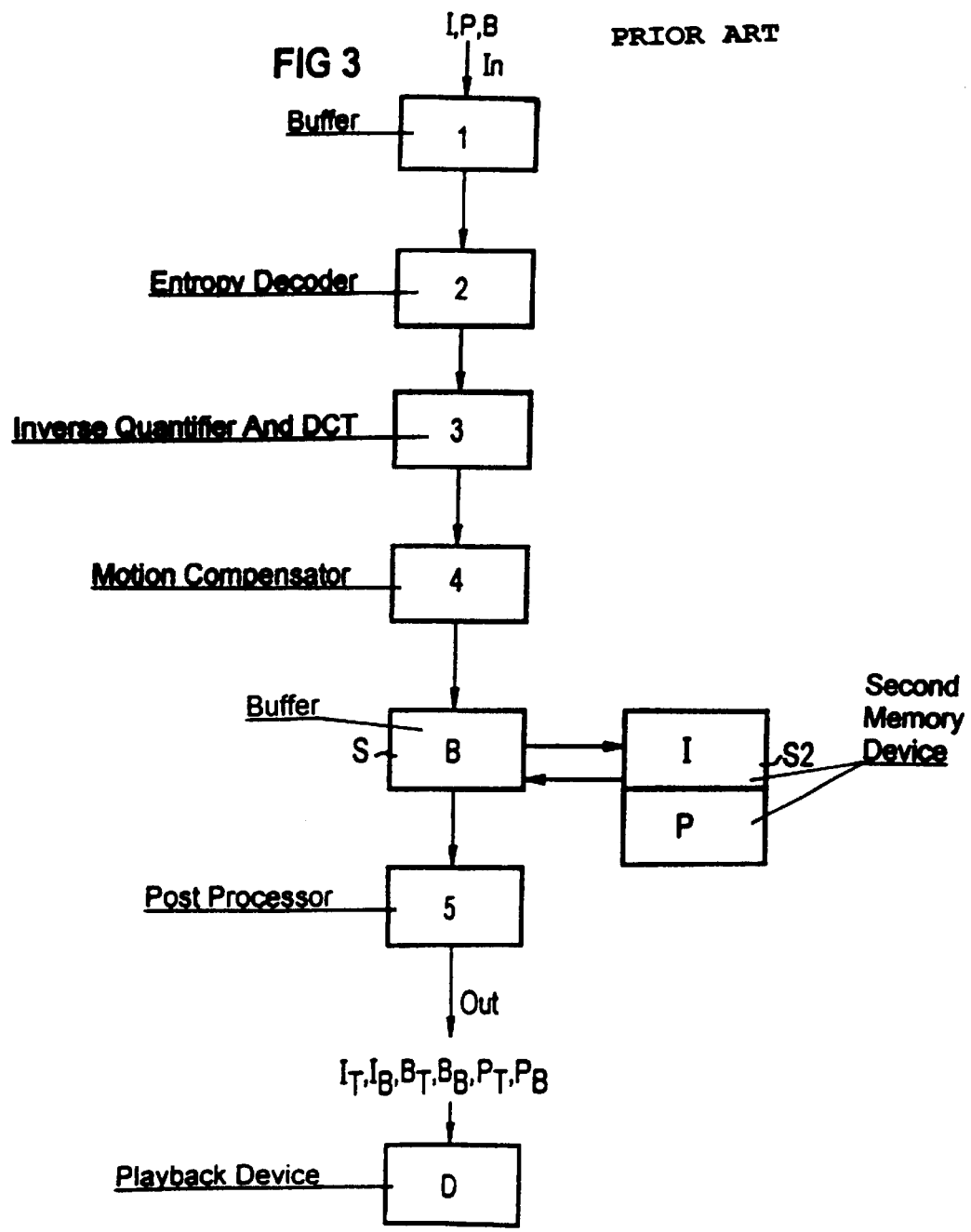

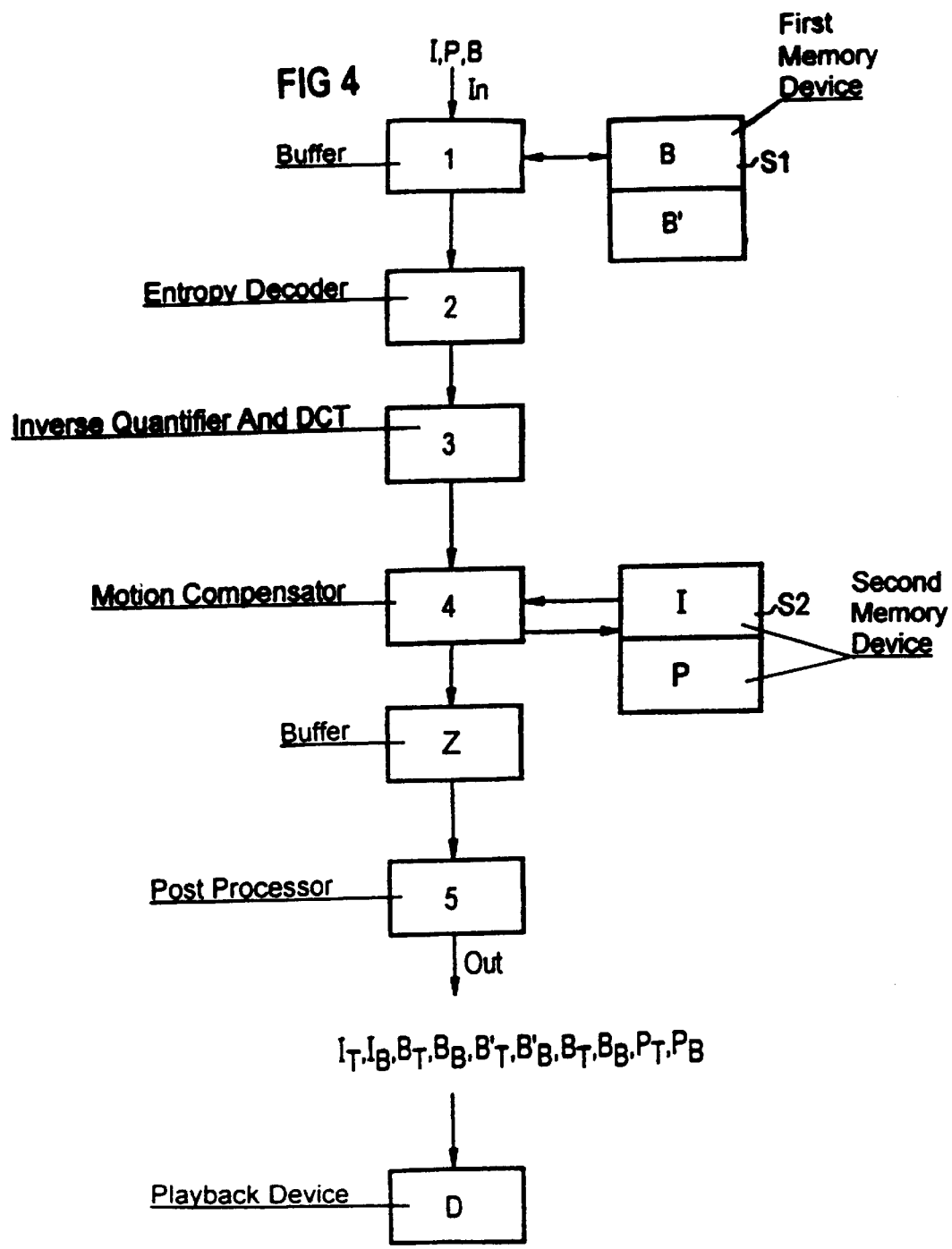

US 6,427,026 B1

VIDEO DECODER AND CORRESPONDING METHOD

CROSS-REFERENCE TO RELATED APPLICATION

This is a continuation of copending International Application PCT/DE97/00866, filed Apr. 22, 1997, which designated the United States.

BACKGROUND OF THE INVENTION

Field of the Invention

The invention relates to a video decoder and a corresponding method.

For coding video images, the MPEG standard has become established. It combines the principles of transformation and prediction coding with so-called hybrid coding. It contemplates three types of coded images, which are distinguished depending on the type of data compression:

1. I images (intra-coded images): The coding of an I image is done independently of other images. An I image is used to synchronize the transmission of a plurality of successive video images, and its coding utilizes the local correlation of the image data of the I image. The coding is preferably a discrete cosine transformation or DCT, followed by quantification and weighting of the transformation coefficients with ensuing entropy coding.
2. P images (predicted images): Their coding is dependent on a chronologically preceding I or P image (forward prediction). P images are subjected to motion estimation with respect to the preceding image (motion-compensated prediction). Next, intra-image coding (for example in the way described above for an I image) is used on the chronological prediction errors.
3. B images (bidirectionally predicted images): In these, chronological motion-compensated prediction is used, both with regard to a chronologically preceding and to a chronologically succeeding P or I image. The term "motion-compensated interpolation" is also used. The expressions (chronologically) "succeeding" or "preceding" refer not to the order of transmission of the images in the data stream of coded images but rather to their order of recording and playback. Images that are the basis for chronological prediction for coding another image are also known as support images. Like P images, B images are also coded in the form of quantified transformation coefficients of a differential image.

It is also known, particularly for showing on TV sets using the PAL or NTSC standard, for the playback of video images to be done not in the form of a so-called full frame but rather as two successive half-frames ("interlaced format"). A full frame has the total video image to be shown and thus includes all the lines of the image. Full frames are also called "frames". Conversely, each of the two half frames ("fields") includes only half of all the lines of one video image. The so-called "top field" or first half-frame involves all the even-numbered lines, while the "bottom field" or second half-frame involves all the odd-numbered lines of the associated full frame.

An MPEG decoder must accordingly decode not only the coded video images in the correct order but also, if they are to be shown on TV sets on the PAL or NTSC standard, must assure that the requisite two half-frames required for the purpose will be furnished. The video images transmitted may, however, be either frame-coded or field-coded. In the first case, the video images that are transmitted are full frames, while in the second case they are half-frames, two of each of which again form one full frame.

MPEG decoders have memory devices for storing previously decoded support images. Storing the I or P images in memory is necessary, because they are the basis for a chronological prediction of a P or B image and are thus needed for decoding of that image. If a coded B image received from the decoder is to be processed, for instance, then decoding of the B image is done with the aid of the two support images used for its bidirectional prediction. It is noted that the support images were previously received by the decoder and stored in memory.

It is also known to store the support images, required for decoding a B image, not in decoded form but rather in coded form in the decoder in order to save memory space. However, this method has the disadvantage that the data throughput to be handled by the decoder is sharply increased. The same I and P images in fact generally serve to decode many B images, so that they have to be often decoded correspondingly. An even more decisive factor, however, is that in MPEG, block-based coding is contemplated, and the prediction regions in the support images that are used for the prediction often deviate from the block limits. To decode one block of a B image, therefore, four blocks of each of the two coded memorized support images must therefore be decoded. This means eight times the data throughput, compared with storage of decoded support images, is needed. The eight times greater data quantity, however, must as before be handled in the same unit of time available in total for decoding the predicted coded image. The demands in terms of performance of the decoder are accordingly considerably greater than in the case of support images stored in decoded form.

In conventional MPEG decoders, a memory device is also provided in which the decoded B image is stored ("an output frame buffer"). The memory device is needed in conventional decoders in the case of a frame-coded B image, since as already noted two half-frames have to be created from the full frame by the decoder and if the full frame is to be shown in interlaced format, the two half-frames must be present successively at an output of the decoder. In the case of field-coded B images, however, the output frame buffer is still necessary for another reason. In some applications, it may be necessary (for instance for adaptation of different frame frequencies between the recording system and the playback system) for not merely two half-frames to be shown to make up one full frame but instead for the first half-frame to be repeated again after the second half-frame has been shown.

SUMMARY OF THE INVENTION

It is accordingly an object of the invention to provide a video decoder and a corresponding method, which overcomes the above-mentioned disadvantages of the prior art devices and methods of this general type, in which the memory requirement is low.

With the foregoing and other objects in view there is provided, in accordance with the invention, a video decoder, including: a memory storing a compression-coded image; a decoder having an output, the decoder receives the compression-coded image and performs a first decoding of the compression-code image and outputs a first decoded image at the output to be received by a playback device for playback; and the decoder subsequently performing a second decoding of the compression-coded image resulting in a second decoded image and outputting the second decoded image to the output.

According to the invention, the first image is stored in memory in the decoder not in decoded form (as in the prior art) but rather in coded form. To generate the necessary half-frames for playback, decoding is done at least twice. After each decoding operation, the outcome of decoding is output to an output of the decoder, in order to play it back (for instance using a TV set). An output frame buffer as in the prior art is not necessary. For storing the coded first image in memory, less memory space is necessary than if it were stored in decoded form as is the case in the prior art. The invention is not limited to the instance of MPEG decoders. It also relates to all cases where information must be generated multiple times from a first image for playback. Unlike the prior art, the stored, coded first image for generating the various information (such as two half-frames from one full frame) is newly decoded each time (each time, the image may need to be decoded only in part and not completely). In the prior art, complete decoding of the image is done first, the image is stored in memory and then output multiple times (for instance, outputting the two half-frames of a decoded full frame). The invention can also be used in decoding methods in which chronological prediction is not performed and no support images are provided.

In accordance with an added feature of the invention, there is a further memory connected to the decoder and stores a further image, the compression-coded image is predicted time-wise with respect to the further image in the decoder and the compression-coded image is not used for time-wise prediction of any other coded image, and the decoder decoding the compression-coded image in each case with the aid of the further image stored in the further memory.

The invention relates to a video decoder by the MPEG standard and provides that the first image is predicted chronologically to a second image but is not itself needed to decode another image (that is, it is not used for chronological prediction of another image and therefore need not be decoded to decode another image). A first image of this kind may for instance be a P or B image.

Compared with the prior art in which storage of the coded support images (namely, I images and/or P images) is provided, the invention has the advantage that a far lesser quantity of data has to be decoded. This is for the following reasons: In the prior art, before a B image is decoded, the I and P images, which are stored in coded form and are the basis for its chronological prediction, must first be decoded. This decoding of the I images and P images must be done anew for each B image to be decoded. This multiplies the amount of data to be decoded by the decoder.

In the invention, conversely, in the worst case the quantity of data to be decoded is doubled, specifically in the case of a frame-coated B image as the first image, in which according to the invention a first decoding is done to create the first half-frame and a second decoding is done to create the second half-frame from the coded full frame. Advantageously, however, the doubling of the data quantity to be decoded can be avoided, since to obtain one half-frame from a coded full frame, at most a limitation to decoding of the lines relevant to the half-frame to be created can be done. This is true for instance for motion compensation, but also for most cases of inverse quantification and inverse DCT.

In accordance with an additional feature of the invention, the compression-coded image is a full frame, and the decoder creates a first half-frame from the compression-coded image by the first decoding and a second half-frame from the second decoding.

In accordance with another feature of the invention, after the second decoding the decoder creates again the first half-frame by a third decoding of the compression-coded image stored in the memory which results in a third decoded image and outputs the third decoded image to the output.

In accordance with a further added feature of the invention, the compression-coded image is a first half-frame ($B_T$), and the decoder serving by successive decodings to successively create a stored first half-frame, a coded second half-frame, and again the stored first half-frame.

In accordance with a further additional feature of the invention, the memory stores in addition to the compression-coded image a compression-coded further image, the decoder decodes the compression-coded further image multiple times and outputs the results of the decoding to the output.

With the foregoing and other objects in view there is also provided, in accordance with the invention, a method for decoding image data, which includes: storing a compression-coded image in a memory resulting in a stored image; decoding the stored image in a decoder having an output resulting in a first decoded image, the decoder outputting the first decoded image at the output for playback by a playback device; and decoding the stored image a second time resulting in a second decoded image and outputting the second decoded image to the output.

In accordance with a concomitant feature of the invention, there are the steps of storing a further image in a further memory; predicting the compression-coded image time-wise with respect to the further image and the compression-coded image is not used for time-wise prediction of any other coded image; and performing the decoding of the compression-coded image each time with the aid of the further image stored in the further memory.

Other features which are considered as characteristic for the invention are set forth in the appended claims.

Although the invention is illustrated and described herein as embodied in a video decoder and a corresponding method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTIONS OF THE DRAWINGS

FIGS. 1, 2 and 4 are block diagrams of various exemplary embodiments according to the invention; and FIG. 3 is a block diagram of a layout of a conventional, prior art MPEG decoder.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 3 thereof, there is shown an input In of the convention decoder for video images, a coded second image I, a coded third image P, and a coded first image B are applied in succession. This corresponds to the order of data transmission, but not the order of recording or playback, and is determined by the type of coding. Let it be assumed that the first image B is a B image, the second image I is an I image, and the third image P is a P image.

Whichever coded image has just been applied is buffer-stored in an input buffer 1 and then subjected to entropy decoding 2, inverse quantification and inverse DCT (discrete cosine transformation) 3, and if the relevant image is predicted time-wise (chronologically), to motion compensation 4 as well.

A post-processing unit 5 precedes an output Out of the decoder. It outputs the images assumed in the present case to be frame-coded images I, P, B as half-frames $I_T$, $I_B$; $B_T$, $B_B$; and $P_T$, $P_B$, respectively, in the interlaced format. The second image I and the third image P, which are necessary as support images for decoding the first image B, are stored in decoded form in a second memory device S2, while the decoded first image B is stored in an output frame buffer S for later decomposition into the two half-frames $B_T$, $B_B$.

The images decoded by the decoder at the output Out can then be supplied for playback to a playback device D.

In the prior art, it may also be provided that the support images I, B are stored in memory in the coded state, and that they are decoded for each decoding operation to be performed on a B image predicted time-wise on the basis of them.

FIG. 1 shows a first exemplary embodiment of the invention. Like the decoder already known from the prior art in FIG. 3, the decoder of the invention has the input buffer 1, the entropy decoder 2, the unit 3 for performing the inverse quantification and the inverse DCT, the device for motion compensation 4, and the post-processing unit 5, as well as the second memory device S2 for storing a decoded second image I and a third image P, which serve as support images for an ensuing decoding operation. In the exemplary embodiment it is assumed that the second image I is an I image and the third image P is a P image, which is predicted time-wise with respect to the second image I.

In succession, the coded second image I, the coded third image P, and a first image B (in this case a B image which has been predicted time-wise bi-directionally with respect to the two preceding support images I, P) are applied to an input In of the decoder. While the second image I and the third image P are decoded in a known manner and stored in the second memory device S2, the first image B is first stored in coded form in a first memory device S1.

The half-frames $I_T$, $I_B$, $B_T$, $B_B$, $P_T$, $P_B$ of the I image I, the B image B, and the P image P, as they have been created by the decoder for subsequent showing in the interlaced format in this order on a TV set, are applied to the output Out of the decoder. The transmission of the coded images I, P, B in a different order from that necessary for playback (at the output Out of the decoder) follows from the principle of bidirectional prediction and is known from the prior art.

The first image B, stored in the first memory device S1, which in this exemplary embodiment is frame-coded or in other words represents one full frame, is now decoded one time each to create each of the two half-frames $B_T$, $B_B$ by the support images I, P. Under some circumstances, triple decoding may for instance also be necessary, for instance if after the second half-frame $B_B$ has been created the first half-frame $B_T$ is necessary again for playing back the transmitted video images (in FIG. 1, the second transmission of the first half-frame $B_T$ has been suggested at the output Out by putting the symbol in parentheses).

It can be seen from FIG. 1 that between the decoding stages 1–4 and the output Out of the decoder, no further memory devices for storing the decoded first image B or half-frames $B_T$, $B_B$ from it are provided, so that the latter images can be fed directly to the output Out without buffer memories. The output buffer memory S of the prior art, shown in FIG. 3, is thus dispensed with.

By the MPEG standard it is usual to transmit images broken down into so-called macro blocks (for instance, six blocks of 8×8 pixels each). As a consequence, in the decoding of so-called macro block lines, that is groups of 16 image lines each, for instance, instead of the single image lines are first created. Outputting from the decoder for ensuing showing must be done line-by-line, however. To convert the "block-oriented" format into a "line-oriented" format, for use of the invention a small buffer memory must be provided at the place where the output buffer frame S (FIG. 3) is disposed in the prior art. In contrast to the prior art, however, the buffer memory serves to hold only one decoded macro block line at a time (for instance, 16 image lines), not the entire half-frame or full frame to be decoded (288 or 576 image lines, respectively) and is therefore much smaller than an output frame buffer. Once the entire macro block line has been decoded and stored in the buffer memory, the line-by-line outputting necessary for playback can be done. To achieve uninterrupted outputting of decoded image lines, it is appropriate to dimension the buffer memory such that it can hold two macro block lines (a total of 32 image lines, for instance).

After one macro block line has been decoded, it can then be output, image line by image line, while at the same time one further macro block line is decoded, and the data thus created are stored in an ongoing basis, again in the buffer memory, without the preceding macro block line being overwritten.

The first memory device S1 may advantageously be part of the input buffer 1, so that compared with the prior art the buffer need be made larger only enough that along with the first image B to be stored, the images arriving at the input In of the decoder during the storage of the image can also be held. In contrast to the prior art (FIG. 3), no output frame buffer S in which the decoded first image B is stored is needed in the invention. The first memory device S1 (plus the possibly required buffer memory already mentioned in the preceding paragraph) can be made smaller than the output frame buffer S in the prior art.

The creation of the half-frames $B_T$, $B_B$ from the first full frame B can advantageously be done in such a way that in both cases it is not the entire first image B that is decoded but rather only the lines necessary for the half-frames. As a result, the quantity of data to be decoded can be markedly reduced.

As an alternative to the exemplary embodiment shown, it may be provided that in addition to the first image B, the support images I, P are not stored in decoded fashion but again in coded fashion. Then there is even less memory required inside the decoder, although the expenditure for decoding per unit of time then increases.

FIG. 2 shows a second exemplary embodiment of the invention, which differs from that in FIG. 1 in that the first image (in this case again a B image) is not a full frame but rather a first half-frame $B_T$, which together with an additionally transmitted second half-frame $B_B$ forms a field-coded full frame, in contrast to the frame-coded B image B in FIG. 1. The two half-frames $B_T$, $B_B$ are B images and are predicted time-wise with respect to the support images I, P.

In the decoder shown in FIG. 2, the first half-frame $B_T$ is stored in coded fashion in the first memory device S1, since as already noted it may be necessary, after the second partial frame $B_B$ has been output at the output Out, for the first partial frame $B_T$ to be output again. To that end, the second image I (an I image) received first is decoded and stored in the second memory device S2 and at the same time broken down into two half-frames $I_T$, $I_B$ and fed in this order to the output Out. The third image P, which is the next one applied to the input In, is decoded and again stored in memory in the second memory device S2. The coded first partial frame $B_T$ thereupon received at the input In is stored in the first memory device S1 and at the same time, with the aid of the second image I and the third image P which are stored in the second memory device S2, decoded and then fed to the output Out. After that, except for the storage in the first memory device S1, the process is the same for the second half-frame $B_B$. After that, the first half-frame $B_T$ stored in the first memory device S1 is decoded and output once again, whereupon the third image P stored in the second memory device S2 is then broken down into half-frames $P_T$, $P_B$ and output.

It will be noted once again that in block-oriented methods such as MPEG, a relatively small buffer memory for holding two macro block lines must be disposed between the motion compensation 4 and the post processing unit 5, so that instead of the decoded macro block lines, individual image lines can be output.

In alternative embodiments of the invention, it may naturally also be provided that instead of an I image, once again a P image is provided as the second image I, since it is generally known for the images to be predicted both with respect to I images and with respect to P images. The same is true for the case where both support images to be stored in the first memory device are I images.

It is also possible for the second image I (as an I image or P image) to be stored as a single support image in the second memory device S2 (which can then be made correspondingly smaller in size than in the exemplary embodiments in FIGS. 1 and 2), and for the first image B to be a forward-predicted P image, which has been coded with respect to the second image I but has not itself been used for a prediction (although this does not meet the MPEG standard).

It is understood that it is also possible for the coded images I and P, which in FIGS. 1 and 2 have been assumed to be full frames, to be half-frames or to be coded as half-frames, but stored as full frames in the second memory device S2.

FIG. 4 shows a further exemplary embodiment of the invention. This involves an MPEG decoder, but it is definitively noted that the invention is not limited to such decoders. In FIG. 4, in addition to two support images I, P, two B images are applied to the input In, namely a first image B and a fourth image B'. It is assumed that all the images I, P, B, B' are frame-coded or in other words are full frames. In this exemplary embodiment, the two B images B, B' are stored in the first memory device S1. By multiple decoding of these two images B, B', it is then for instance possible to create the half-frames, shown at the output Out, in the order given. In the present case, to create the two respective half-frames, first the first image B is decoded twice. Then the fourth image B' is decoded twice; and after that, the first image B is again decoded twice. Other chronological orders are also attainable, all of them dependent on the form in which playback by the playback device D is to be done.

In FIG. 4, the buffer memory Z already mentioned several times is shown between the motion compensation 4 and the post processing unit 5. It is necessary only in block-oriented coding methods and in an MPEG decoder may logically hold two macro block lines. It is thus substantially smaller than an output frame buffer S of FIG. 3. If the coding and decoding are done not in block-oriented but rather line-oriented fashion, then the buffer memory Z is not necessary. The respective decoded images can then be output directly, line by line.

It is possible for the decoder of the invention to be a component of a corresponding encoder, in which the motion estimate for coding the video images to be transmitted is performed. MPEG encoders in principle also include a decoder for chronological prediction.

The invention can be applied especially advantageously to all video images that are not a basis for chronological prediction of some other image. This pertains accordingly not only to the first images B shown in the two exemplary embodiments of FIGS. 1 and 2, which are assumed as B images to be chronologically bidirectionally predicted, but also (in addition to chronologically unidirectionlly predicted P images) to be chronologically non-predicted images, such as I images.

We claim:

1. A video decoder, comprising:
   a memory storing a compression-coded image;
   a decoder having an output, said decoder receiving the compression-coded image and performing a first decoding of the compression-code image and outputting a first decoded image at said output to be received by a playback device for playback; and
   said decoder subsequently performing a second decoding of the compression-coded image resulting in a second decoded image and outputting the second decoded image to said output.

2. The video decoder according to claim 1, including a further memory connected to said decoder and storing a further image, the compression-coded image being predicted time-wise with respect to the further image in said decoder and the compression-coded image is not used for time-wise prediction of any other coded image, and said decoder decoding the compression-coded image in each case with the aid of the further image stored in said further memory.

3. The video decoder according to claim 1, wherein the compression-coded image is a full frame, and said decoder creating a first half-frame from the compression-coded image by the first decoding and a second half-frame from the second decoding.

4. The video decoder according to claim 3, wherein after the second decoding said decoder creates again the first half-frame by a third decoding of the compression-coded image stored in said memory resulting in a third decoded image and outputting the third decoded image to said output.

5. The video decoder according to claim 1, wherein the compression-coded image is a first half-frame ($B_T$), and said decoder serving by successive decodings to successively create a stored first half-frame, a coded second half-frame, and again the stored first half-frame.

6. The video decoder according to claim 1, wherein said memory stores in addition to the compression-coded image a compression-coded further image, said decoder decoding the compression-coded further image multiple times and outputting results of the decoding to said output.

7. A method for decoding image data, which comprises:
   storing a compression-coded image in a memory resulting in a stored image;
   decoding the stored image in a decoder having an output resulting in a first decoded image, the decoder outputting the first decoded image at the output for playback by a playback device; and
   decoding the stored image a second time resulting in a second decoded image and outputting the second decoded image to the output.

8. The method according to claim 7, which comprises:
   storing a further image in a further memory;
   predicting the compression-coded image time-wise with respect to the further image and the compression-coded image is not used for time-wise prediction of any other coded image; and
   performing the decoding of the compression-coded image each time with the aid of the further image stored in the further memory.

* * * * *